United States Patent
Kobayashi et al.

[11] Patent Number: 6,166,880
[45] Date of Patent: Dec. 26, 2000

[54] THIN FILM MAGNETIC HEAD WHICH PREVENTS ERRORS DUE TO ELECTRIC DISCHARGE

[75] Inventors: Atsuo Kobayashi; Mikio Matsuzaki, both of Tokyo, Japan

[73] Assignee: TDK Corporation, Tokyo, Japan

[21] Appl. No.: 08/259,154

[22] Filed: Jun. 13, 1994

Related U.S. Application Data

[63] Continuation of application No. 07/928,297, Aug. 12, 1992, abandoned.

[30] Foreign Application Priority Data

Aug. 13, 1991 [JP] Japan .................................. 3-228417
Aug. 13, 1991 [JP] Japan .................................. 3-228418
Aug. 13, 1991 [JP] Japan .................................. 3-228420

[51] Int. Cl.$^7$ ............................................... G11B 5/127
[52] U.S. Cl. ............................................................ 360/126
[58] Field of Search ................................. 360/126, 123, 360/125

[56] References Cited

U.S. PATENT DOCUMENTS

| | | | |
|---|---|---|---|
| 4,317,149 | 2/1982 | Elser et al. . | |
| 4,550,353 | 10/1985 | Hirai et al. | 360/126 |
| 4,797,765 | 1/1989 | Ezaki et al. | 360/110 |
| 4,800,454 | 1/1989 | Schwarz et al. | 360/123 |
| 4,816,946 | 3/1989 | Kira et al. | 360/126 |
| 4,853,815 | 8/1989 | Diepers | 360/126 |
| 4,878,290 | 11/1989 | Masud et al. | 29/603 |
| 4,987,514 | 1/1991 | Gailbreath et al. . | |
| 5,116,719 | 5/1992 | Gau | 360/126 |
| 5,198,949 | 3/1993 | Narisawa et al. | 360/126 |
| 5,208,716 | 5/1993 | Lazzari | 360/126 |
| 5,239,435 | 8/1993 | Jeffers et al. | 360/126 |
| 5,247,414 | 9/1993 | Mitchell et al. | 360/126 |
| 5,267,113 | 11/1993 | Matsushita et al. | 360/126 |

FOREIGN PATENT DOCUMENTS 2 83 808   3/1990   Japan .

*Primary Examiner*—George J. Letscher
*Attorney, Agent, or Firm*—Oblon, Spivak, McClelland, Maier & Neustadt, P.C.

[57] ABSTRACT

A thin film magnetic head includes a slider and a thin film magnetic transducing element, wherein the slider is provided with an insulating film on a surface of an electric conductive substrate, the thickness of the insulating film being in a range of 0.5 μm–3 μm, and the thin film magnetic transducing element is formed on the insulating film and has a thin film magnetic circuit including a magnetic film and a coil film.

5 Claims, 7 Drawing Sheets

THIN FILM MAGNETIC HEAD WHICH PREVENTS ERRORS DUE TO ELECTRIC DISCHARGE

This application is a Continuation of application Ser. No. 07/928,297, filed on Aug. 12, 1992, now abandoned.

BACKGROUND OF THE INVENTION

Field of the Invention

The present invention relates to a flying type thin film magnetic head. More particularly, it relates to a thin film magnetic head capable of preventing an electric discharge resulted from accumulation of an electric charge in a capacitor which is formed between a coil film and a magnetic film which constitute a thin film magnetic transducing element.

Discussion of Background

A typical thin film magnetic head comprises a slider and a thin film magnetic transducing element. The slider has an insulating film such as an alumina film having a thickness of 10 $\mu$m or more on a surface of a conductive substrate and the thin film magnetic transducing element is formed on the insulating film. The thin film magnetic transducing element has a coil film having an electric potential and a magnetic film for forming a thin film magnetic circuit in association with the coil film. In such structure, a capacitor is formed between the magnetic film and the coil film.

On the other hand, a small-sized HDD commercialized lately is adapted to use a partial power source of a 5 volt power source for a reading/writing IC so that a 5-volt power source and a 12-volt power source which are used for power sources for a personal computer can be utilized in consideration of using the personal computer. Accordingly, the thin film magnetic head is always biased by a constant voltage, specifically, a positive voltage of 2.5 volts. In this case, an electric charge is accumulated in the capacitor from a specified direction due to a bias voltage.

The electric charge accumulated in the capacitor is discharged due to the contact of the pole portion to a recording medium, whereby a potential at the magnetic film varies. A change of electric potential at the magnetic film produces common mode noises, and an error takes place in the data for reading. Regarding a technique to eliminate such undesired electric discharge, there is a publication such as U.S. Pat. No. 4,987,514. The publication discloses that an electric discharge is prevented by making a bias potential to the thin film magnetic head equal to the electric potential at a recording medium.

In the conventional technique, however, it is necessary to provide an electric potential equalizing means to the recording medium rotated in order to equalize the electric potential of the medium to a bias potential of the thin film magnetic head. Accordingly, the construction of the magnetic disk device is complicated and large-sized as well as cost increased.

SUMMARY OF THE INVENTION

It is an object of the present invention to provide a thin film magnetic head and a thin film magnetic head device using such magnetic head in which influence to the thin film magnetic circuit can be greatly reduced and an electric discharge suppressing function can be obtained in a stable manner.

The foregoing and other objects of the present invention have been attained by providing a thin film magnetic head which comprises a slider and a thin film magnetic transducing element, wherein the slider is provided with an insulating film on a surface of an electrically conductive substrate, the thickness of the insulating film being in a range of 0.5 $\mu$m–3 $\mu$m, and the thin film magnetic transducing element is formed on the insulating film and has a thin film magnetic circuit including a magnetic film and a coil film.

According to the present invention, there is provided a thin film magnetic head which comprises a slider and a thin film magnetic transducing element, wherein the slider has an electrically conductive substrate as the major portion, and the thin film magnetic transducing element comprises a magnetic film and a coil film, the magnetic film being directly formed on the electrically conductive substrate.

According to the present invention, there is provided a thin film magnetic head which comprises a slider and a thin film magnetic transducing element, wherein the slider comprises an electrically conductive substrate as the major portion and an insulating film formed on the electrically conductive substrate, and the thin film magnetic transducing element comprises a magnetic film and a coil film and is formed on the insulating film so that at least a part of the magnetic film is in direct contact with the electrically conductive substrate through a hole formed in the insulating film.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
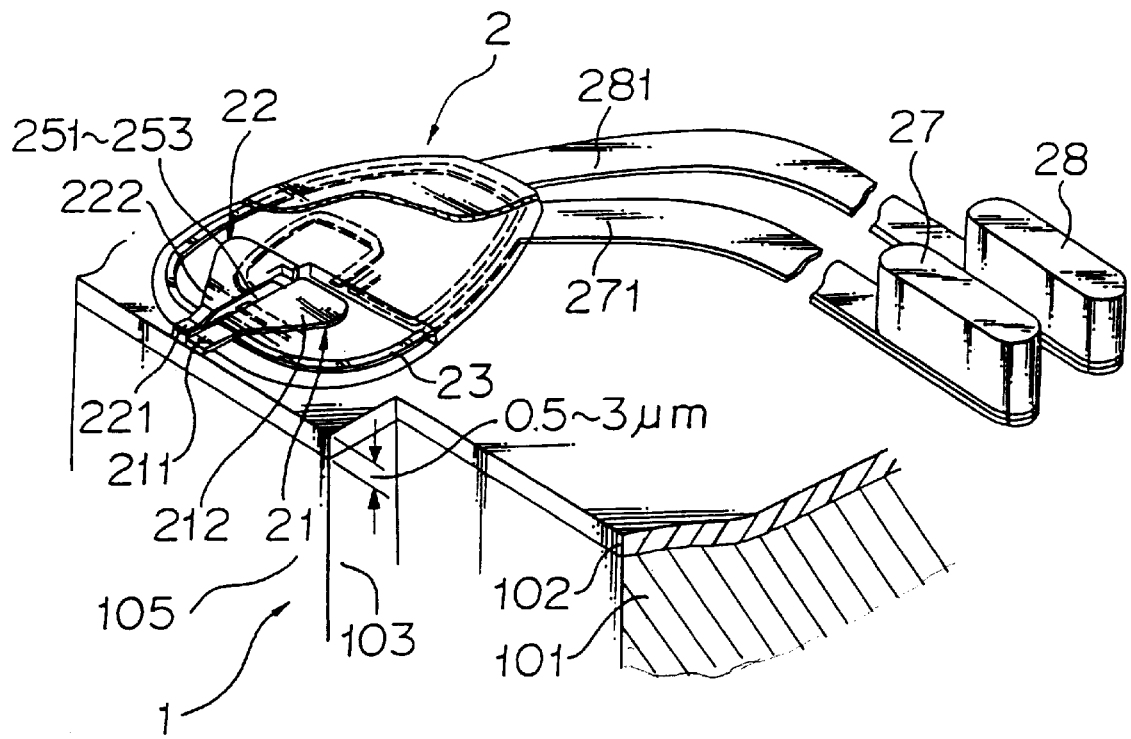
FIG. 1 is a perspective view of a thin film magnetic transducing element used for an embodiment of the thin film magnetic head according to the present invention.
Figure 2:
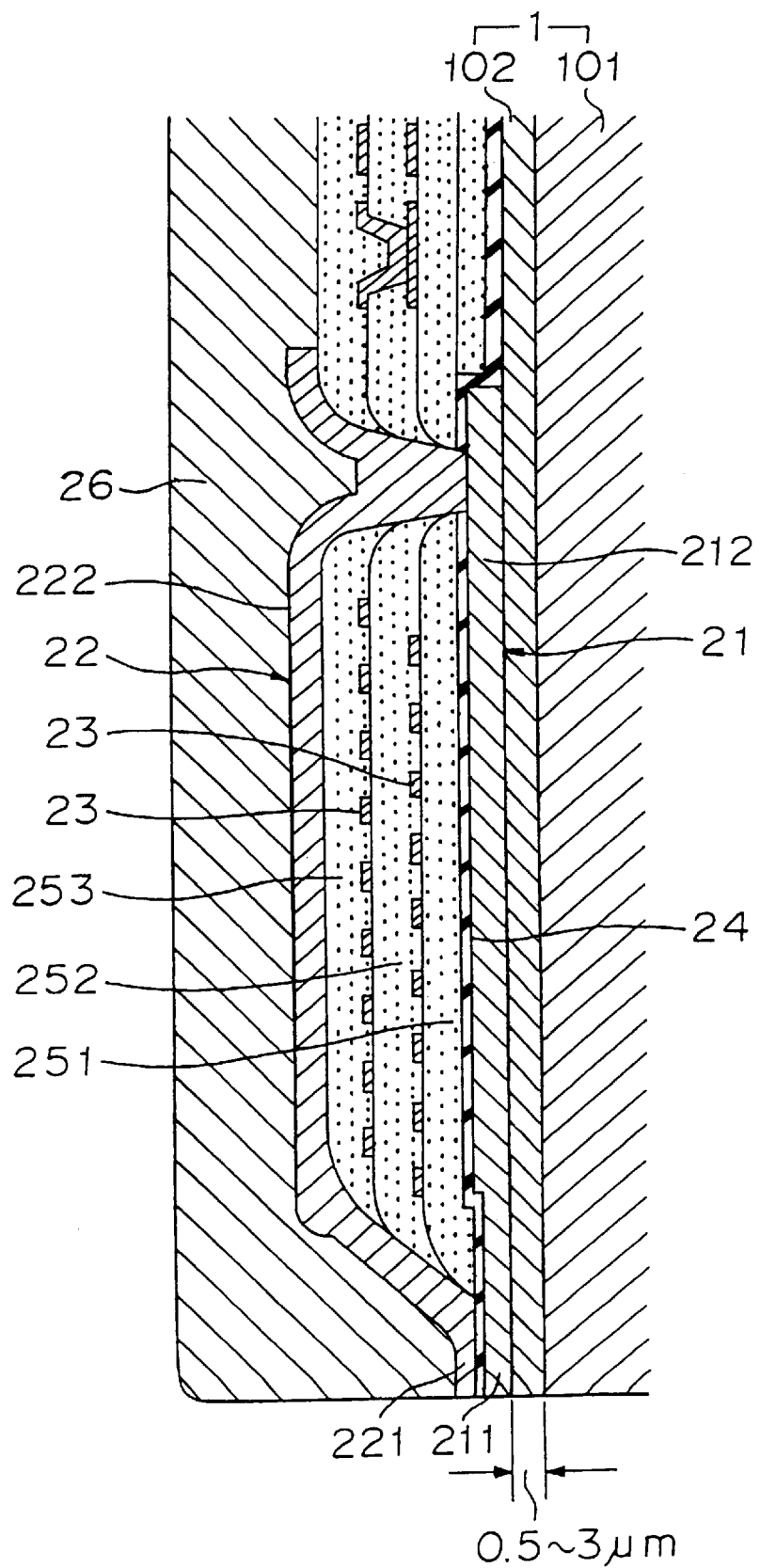
FIG. 2 is an enlarged cross-sectional view of the thin film magnetic transducing element shown in FIG. 1.

Referring to the drawings wherein the same reference numerals designate the same or corresponding parts. FIG. 1 is a perspective view showing an embodiment of the thin film magnetic head including a thin film magnetic transducing element according to the present invention, and FIG. 2 is an enlarged cross-sectional view partly omitted of the thin film magnetic transducing element. The Figures are to show general construction of the thin film magnetic transducing element, and the dimensions of structural elements are exaggerated. In FIGS. 1 and 2, numeral 1 designates a slider, 2 designates a thin film magnetic transducing element.

The slider 1 comprises an electrically conductive substrate 101 made of a material such as $Al_2O_3$-TiC and an insulating film 102 made of a material such as alumina which is formed on the substrate 101. In the slider 1, the thickness of the insulating film 102 is in a range of from 0.5 μm–3 μm. The thin film magnetic transducing element 2 is disposed on the insulating film 102. The thin film magnetic transducing element 2 comprises a magnetic film including a lower magnetic film 21 and an upper magnetic film 22 and coil films 23.

The slider 1 shown in FIG. 1 is provided with two rails 103 at the surface facing a recording medium, and the surfaces of the rails 103 are utilized as air bearing surfaces 105.

The slider 1 may be of a type wherein the surface facing a recording medium has no rail portions and is a flat air bearing surface.

In the thin film magnetic transducing element 2 comprising the lower magnetic film 21, the upper magnetic film 22 and the coil films 23, the lower magnetic film 21 and the upper magnetic film 22 are usually made of a material such as permalloy, and they have pole portions 211, 221 at their one end portions which form a transducing gap. The pole portions 211, 221, extend backwardly to form yoke portions 212, 222 so that a magnetic circuit is formed. The pole portions 211, 221 are spaced apart from each other by interposing a gap film 24 made of a material such as alumina. The coil films 23 are formed in a spiral form around the connecting portion of the lower magnetic film 21 and the upper magnetic film 22. There are provided insulating films 251 through 253 between the coil film 23 and the lower magnetic film 21 and between the coil film 23 and the upper magnetic film 22. The insulating films 251–253 are generally made of an organic resin such as novolak resin. Numeral 26 designates a protective film such as alumina, numerals 27, 28 designate terminal electrodes, and numerals 271, 281 designate lead electrodes.

As described above, since the thickness of the insulation film 102 is in a range of 0.5 μm–3 μm, the insulating resistance of the insulating film 102 is fairly low in comparison with a conventional technique in which the film thickness of the insulating film is 10 μm or higher. The lower magnetic film 21 and the upper magnetic film 22 are electrically connected to the electric conductive substrate 101, which is kept at the ground potential, by interposing the insulating film 102 having a lower insulation resistance, and accordingly, potential difference between the magnetic films 21, 22 and the insulating film 102 is reduced to a value which is determined by the insulation resistance of the insulating film 102 and a leakage current. Accordingly, a possibility of an electric discharge between a recording medium (not shown) and the pole portions 211, 221 of the magnetic films 21, 22 resulted from the accumulation of an electric charge in a parasitic capacitor, and a possibility of an error in the data to be read which is caused by the electric discharge, can be reduced.

In the above-mentioned embodiment, since the thickness of the insulating film 102 is in a range of 0.5 μm–3 μm, an insulation resistance required for the thin film magnetic circuit can be assured. Further, since the coil films 23 are insulated by means of the organic insulating resinous films 251–253, an electric insulation required for the coil films is sufficient even though the thickness of the insulating film 102 is thin as described above.

Further, it is enough that the thickness of the insulating film 102 of the slider 1 is controlled. It is no danger of causing adverse effect to the thin film magnetic circuit. Further, since any additional step of manufacturing the thin film magnetic head is required, it is advantageous in that generally used steps for manufacturing can be utilized.

The above-mentioned embodiment provides the following advantages.

(a) Since the thickness of the insulating film of the slider is in a range of 0.5 μm–3 μm, and the thin film magnetic transducing element is disposed on the insulating film, there can be provided a thin film magnetic head capable of reducing a possibility of an electric discharge between a recording medium and the pole portions of the magnetic film resulted from the accumulation of an electric charge in the parasitic capacitor and a possibility of an error in data to be read due to the electric discharge, in comparison with a conventional technique having a film thickness of the insulating film of 10 μm or more.

(b) Since the thickness of the insulating film is in a range of 0.5 μm–3 μm, the insulation resistance required for the thin film magnetic circuit can be maintained.

(c) Since it is enough to control the thickness of the insulating film of the slider, there can be provided a thin film magnetic head allowing easy manufacture by using ordinary manufacturing steps without requiring special manufacturing steps while there is no danger of causing adverse effect to the thin film magnetic circuit.

Figure 3:
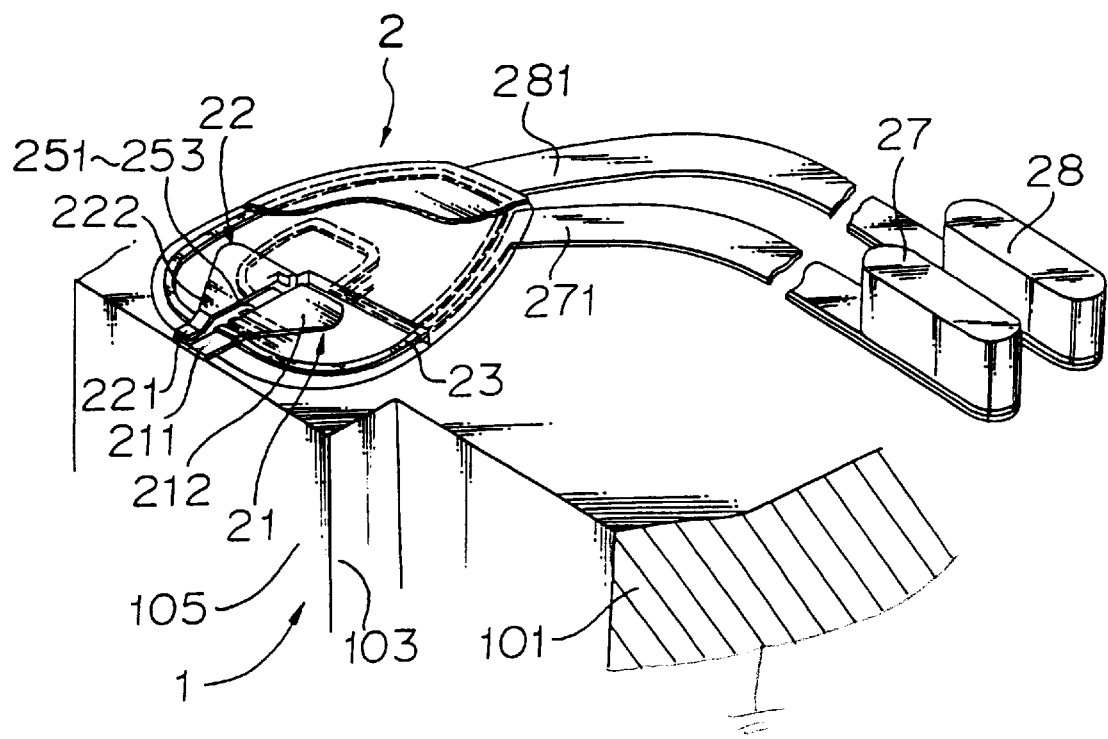
FIG. 3 is a perspective view of a thin film magnetic transducing element of a second embodiment of the thin film magnetic head according to the present invention.
Figure 4:
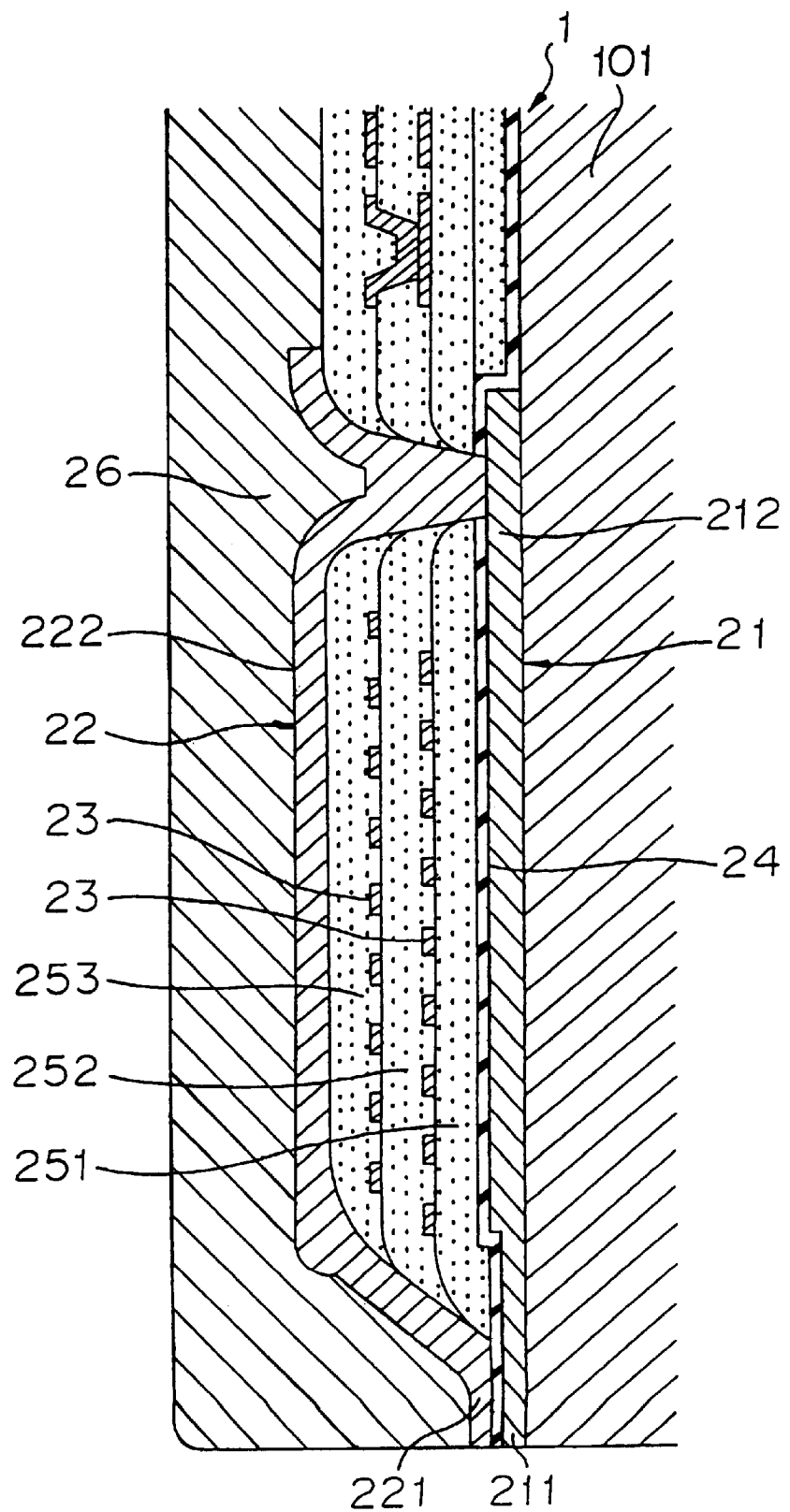
FIG. 4 is an enlarged cross-sectional view of the thin film magnetic transducing element shown in FIG. 3.

FIG. 3 is a perspective view of another embodiment of the thin film magnetic head of the present invention in which a thin film magnetic transducing element is shown in detail, and FIG. 4 is an enlarged cross-sectional view of the thin film magnetic transducing element. In FIGS. 3 and 4, reference numeral 1 designates a slider and numeral 2 designates a thin film magnetic transducing element.

The slider 1 comprises an electrically conductive substrate, as the major portion, which is made of a material such as $Al_2O_3$-TiC. The thin film magnetic transducing element 2 is directly formed on a surface of the electrically conductive substrate 101. In a conventional technique, an insulating film such as alumina was formed on the substrate.

The slider 1 may be of a type wherein rails are formed in the surface of the slider facing a recording medium, or a type wherein the medium facing surface of the slider 1 is flat.

The thin film magnetic transducing element 2 comprises a lower magnetic film 21, an upper magnetic film 22 and coil films 23. In the second embodiment, the lower magnetic film 21 is directly formed on an end surface of the electrically conductive substrate 101. The construction of the thin film magnetic transducing element except for the above-mentioned is the same as that of the first embodiment, and accordingly, description is omitted.

In the second embodiment, since the slider 1 comprises the electrically conductive substrate 101 as its major portion, and the lower magnetic film 21 of the thin film magnetic transducing element 2 is formed directly on the electrically conductive substrate 101, the lower magnetic film 21 and the upper magnetic film 22 are kept at the same electrically potential as the electric conductive substrate 101 which has the ground potential. Accordingly, there is no danger that an electric discharge takes place between a recording medium (not shown) and the pole portions 211, 221 of the magnetic films 21, 22 due to the accumulation of an electric charge even when the electric charge is accumulated in the capacitor between the coil films 23 and the upper and lower magnetic films 21, 22. Further, there is no danger of causing adverse effect in terms of magnetism to the thin film magnetic circuit.

Since the coil films 23 are insulated by means of the organic insulating resinous films 251–253, the electric insulation required for the coil films 23 can be assured even though the lower magnetic film 21 is formed in direct contact with the electrically conductive substrate 101.

Lead electrodes 271, 281 and bonding electrodes 27, 28 connected to the coil films 23 are electrically insulated from the electrically conductive substrate 101 because insulating films of a material such as alumina are provided underneath such elements.

The second embodiment of the present invention provides the following advantages.

(a) Since the major portion of the slider is formed of the electrically conductive substrate and the magnetic layer of the thin film magnetic transducing element is disposed directly on the electrically conductive substrate, a thin film magnetic head free from occurrence of an electric discharge between a recording medium and the pole portion of the magnetic film due to the accumulation of an electric charge in the capacitor and an error in data to be read which is caused by the electric discharge, can be provided.

(b) A thin film magnetic head having an electric discharge preventing structure by which there is no adverse effect in terms of magnetism to the thin film magnetic circuit, can be provided.

Figure 5:
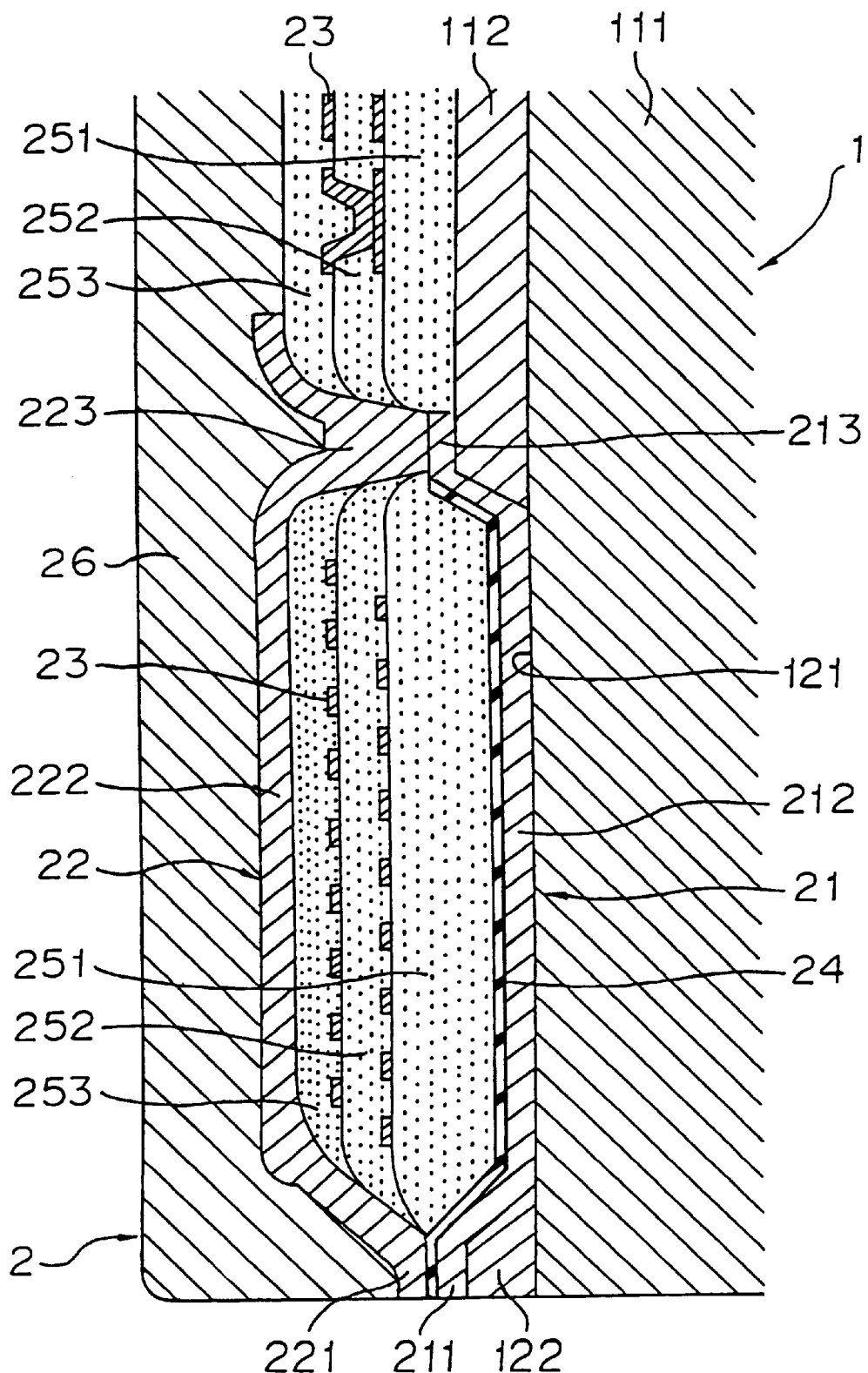
FIG. 5 is an enlarged cross-sectinal view of a thin film magnetic transducing element used for a third embodiment of the thin film magnetic head of the present invention.

FIG. 5 is an enlarged cross-sectional view of an embodiment of the thin film magnetic transducing element of the thin film magnetic head of the present invention. In FIG. 5, numeral 1 designates a slider and numeral 2 designates a thin film magnetic transducing element.

The slider 1 comprises an electrically conductive substrate 111 as the major portion which is made of a material such as $Al_2O_3$-TiC, and an insulating film 112 made of a material such as alumina which is formed on a surface of the electrically conductive substrate 111.

The thin film magnetic transducing element 2 comprises a lower magnetic film 21, an upper magnetic film 22 and coil films 23. The lower magnetic film 21 is formed in direct contact with the electrically conductive substrate 111 through a hole 121 formed in the insulating layer 112. The lower magnetic film 21 and the upper magnetic film 22 are made of a material such as permalloy; they respectively have pole portions 211, 221 at end portions by which a transducing gap is formed; and they respectively have yoke portions 212, 222. The rear portions 213, 223 of the yoke portions 212, 222 which are opposite the pole portions 211, 222, are connected to each other so as to form a magnetic circuit. The pole portions 211, 222 are separated from each other by means of a gap film 24 made of a material such as alumina. The lower magnetic film 21 has the yoke portion 212 the major portion of which is formed on the electrically conductive substrate 111 through the hole 121 formed in the insulating film 112, and the pole portion 211 of the lower magnetic film 21 is supported by an insulating film portion 122 remaining at an end portion of the electrically conductive substrate 111. The surface level of the yoke portion 212 is stepwisely depressed from the surface level of the pole portion 211.

The coil films 23 are arranged so that they are extended in a space formed between the yoke portions 212, 222 and they are supported by the organic insulating films 251–253 so as to be wound around the connecting portion of the yoke portions 212, 222. The organic insulating films 251–253 are generally made of an organic resinous material such as novolak resin. Numeral 26 designates a protective film such as alumina.

In the third embodiment of the present invention, since the lower magnetic film 21 of the thin film magnetic transducing element 2 is formed in direct contact with the electrically conductive substrate 111 through the hole 121 formed in the insulating film 112, the lower magnetic film 21 and the upper magnetic film 22 are kept at the same potential as the electrically conductive substrate 111 which has the ground potential. Accordingly, there is no possibility of an electric discharge between a recording medium (not shown) and the pole portions 211, 221 of the magnetic films 21, 22 resulting from the accumulation of an electric charge in the capacitor between the coil films 23 and the lower and upper magnetic films 21, 22. Further, there is no danger of resulting adverse effect in terms of magnetism to the thin film magnetic circuit.

Further, since the thin film magnetic transducing element 12 is provided on the insulating film 112, the coil films 23 of the thin film magnetic transducing element 2 is insulated not only by the organic insulating films 251, 252 but also the insulating film 112.

Figure 6:
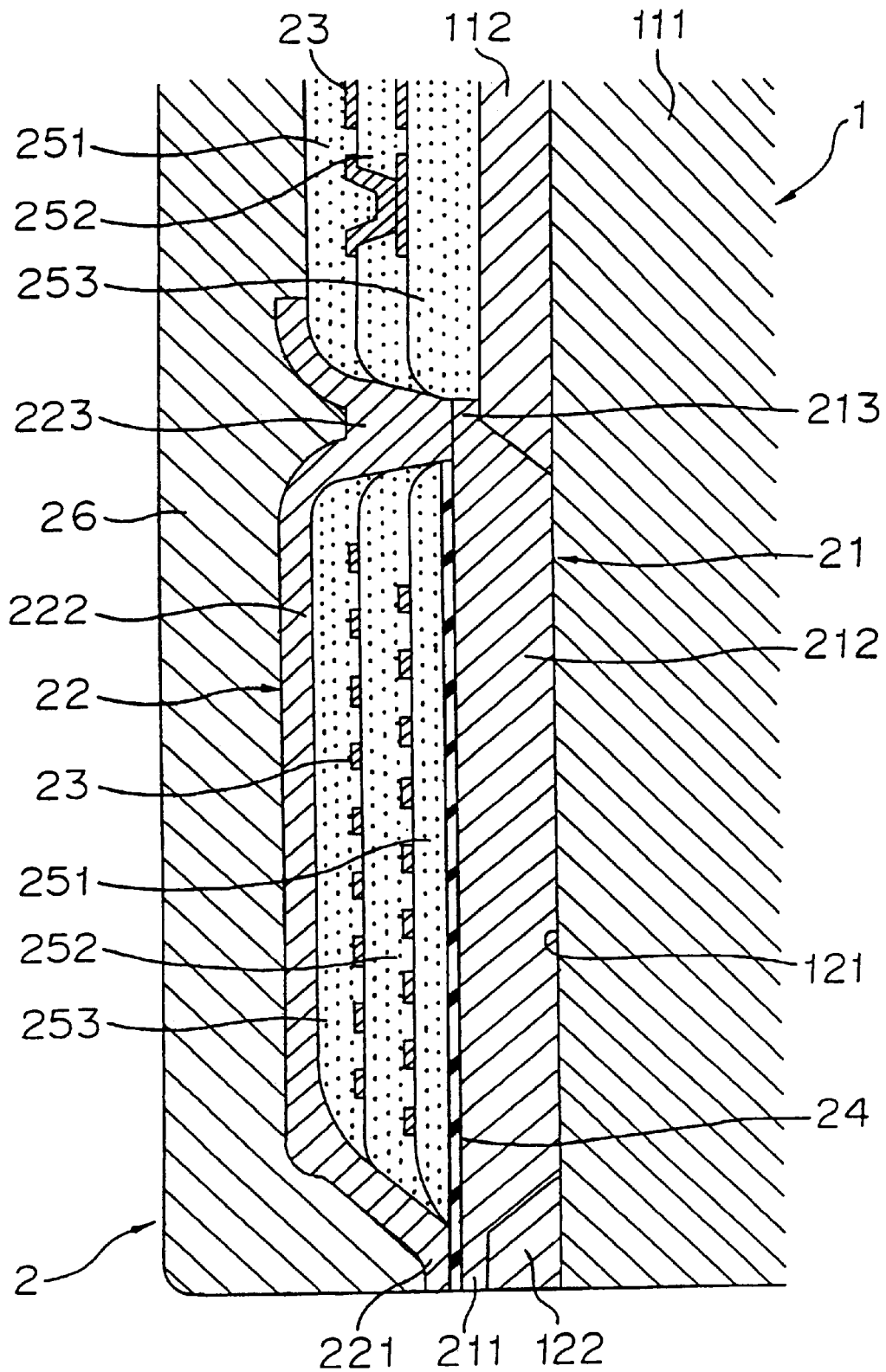
FIG. 6 is an enlarged cross-sectional view of a thin film magnetic transducing element of a fourth embodiment of the thin film magnetic head according to the present invention.

FIG. 6 is an enlarged cross-sectional view of an embodiment of the thin film magnetic transducing element of the thin film magnetic head of the present invention. In FIG. 6, the same reference numerals as in FIG. 5 designate the same or corresponding parts. In this embodiment, the lower magnetic film 21 is formed in direct contact with the electrically conductive substrate 111 through a hole formed in the insulating film 112. The surface level of the yoke portion 212 is substantially flush with the surface level of the pole portion 211.

Figure 7:
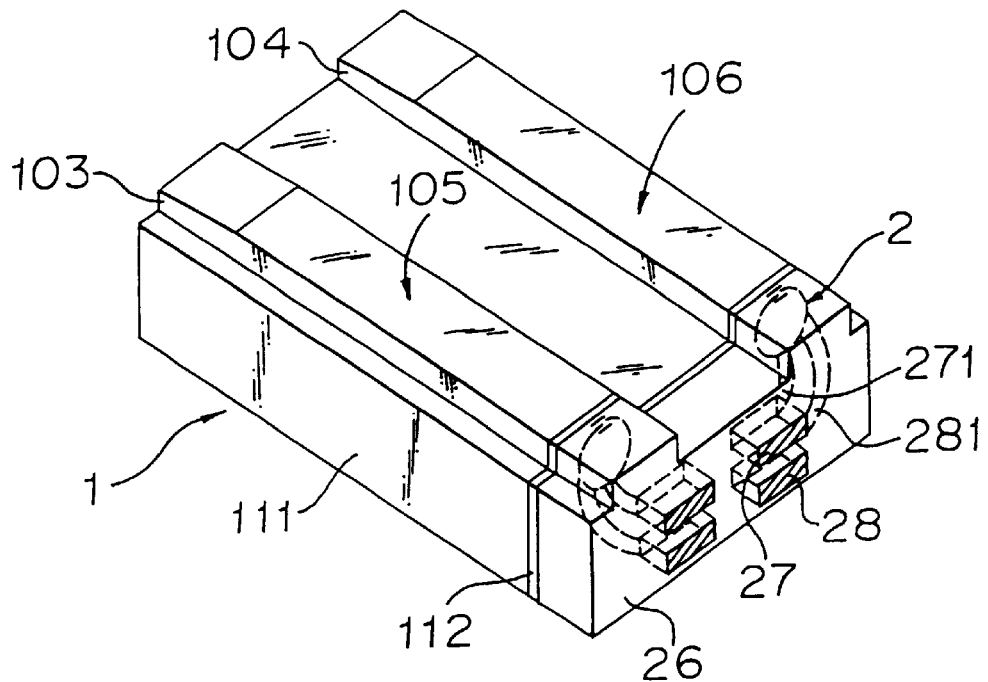
FIG. 7 is a perspective view of another embodiment of the thin film magnetic head of the present invention.
Figure 8:
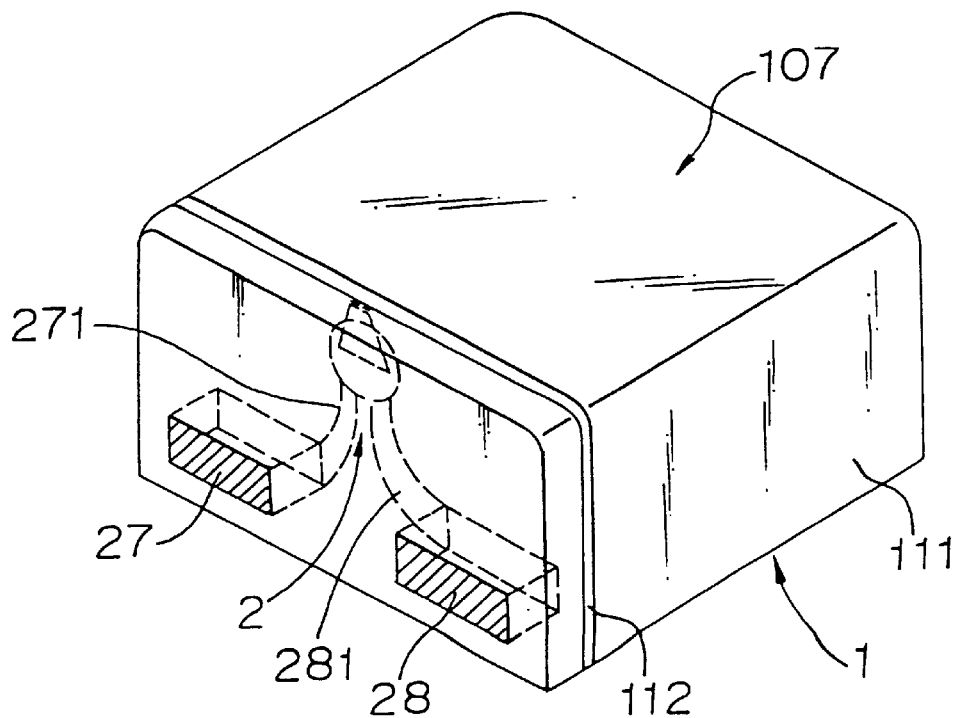
FIG. 8 is a perspective view of another embodiment of the thin film magnetic head of the present invention.

In the above-mentioned thin film magnetic head of the present invention, the slider 1 can be formed to have a different structure. FIGS. 7 and 8 show two examples of structure.

In FIG. 7, the slider 1 has two rails 103, 104 at the surface facing a recording medium and the surfaces of the rails 103, 104 are utilized as air bearing surfaces 105, 106. Numerals 27, 28 designate bonding electrodes connected to the coil films 23, and numerals 271, 281 designate lead electrodes. These electrodes are provided on the insulating film 112 as an element of the slider 1. Accordingly, the insulating film 112 provides a sufficient insulation between the electric conductive substrate 111 and these electrodes 27, 28, 271 and 281.

FIG. 8 shows such slider 1 that the surface of the slider facing a recording medium is a flat air bearing surface 107 without having rail portions. The bonding electrodes 27, 28 and the lead electrodes 271, 281 are provided on the insulating film 112 by which a sufficient electrical insulating can be maintained between the electrically conductive substrate 111 and these electrodes.

The third and subsequent embodiments of the present invention provides the following advantages:

(a) The thin film magnetic transducing element is so arranged that at least a portion of the magnetic film is formed in direct contact with the electrically conductive substrate through a hole formed in the insulating film of the slider. Accordingly, there can be provided a thin film magnetic head which suppresses an electric discharge between a recording medium and the pole portions of the magnetic films due to the accumulation of an electric charge in the capacitor and an error 2 data to be read which is caused by the electric discharge.

(b) A thin film magnetic head having an electric discharge preventing structure in which there is no adverse effect in terms of magnetism to the thin film magnetic circuit can be provided.

(c) The insulating film is formed on a surface of the electrically conductive substrate, the thin film magnetic transducing element is provided on the insulating film, and the magnetic film of the thin film magnetic transducing element is formed in direct contact with the electrically conductive substrate through a hole formed in the insulating film. Accordingly, a thin film magnetic head providing a sufficient electrical insulation by the insulating film between the electrically conductive substrate and the coil films of the thin film magnetic transducing element as well as the lead electrodes and the bonding electrodes, can be provided.

In the above-mentioned embodiments, description has been made as to an in-plane recording/reproducing thin film magnetic head. However, the present invention is applicable to a vertical recording/reproducing thin film magnetic head.

Obviously, numerous modifications and variations of the present invention are possible in light of the above teachings. It is therefore to be understood that within the scope of the appended claims, the invention may be practiced otherwise than as specifically described herein.

What is claimed is:

1. A thin film magnetic head which comprises:
    a slider and a thin film magnetic transducing element, wherein said slider is provided with an insulating film directly formed on a surface of an electrically conductive substrate, a thickness of said insulating film being in the range of 0.5 $\mu$m–3 $\mu$m, and said thin film magnetic transducing element is formed on said insulating film and has a thin film magnetic circuit including a magnetic film and a coil film, wherein said insulating film is formed between said electrically conductive substrate and said magnetic film and allows an equipotential to be formed therebetween because of its thickness, and wherein said coil film is electrically insulated by an organic insulating resinous film having an insulation resistance sufficient to electrically insulate said coil film in view of the thickness of said insulating film.

2. The thin film magnetic head according to claim 1, wherein the magnetic film comprises a lower magnetic film and an upper magnetic film;
    the lower and upper magnetic films having respectively a pole portion which constitutes a transducing gap, and a yoke portion contiguous with the pole portion, the pole portions facing one another with a space therebetween and being connected to each other at a position opposing the transducing gap;
    the substantial portion of the yoke portion in the lower magnetic film being in contact with the electrically conductive substrate through a hole formed in said insulating film;
    the pole portion of a lower magnetic film being supported by the insulating film; and
    the coil film being arranged so as to extend through the space formed between the yoke portions and to be wound around the connected portion of the yoke portions, and being supported by an organic insulating film.

3. The thin film magnetic head according to claim 2, wherein the lower magnetic film is so arranged that the surface level of the yoke portion is stepwisely depressed from the surface level of the pole portion.

4. The thin film magnetic head according to claim 2, wherein the lower magnetic film is so arranged that the upper surface of the yoke portion is substantially flush with the surface level of the pole portion.

5. A thin film magnetic head which comprises:
    a slider and a thin film magnetic transducing element, wherein said slider comprises an electrically conductive substrate as its major portion and an insulating film formed on said electrically conductive substrate, a thickness of said insulating film being in the range of 0.5 $\mu$m–3 $\mu$m, and said thin film magnetic transducing element comprises a magnetic film and a coil film and its formed on said insulating film so that at least a part of said magnetic film is in direct contact with said electrically conductive substrate through a hole formed in said insulating film, wherein said insulating film is formed between said electrically conductive substage and said magnetic film and an equipotential is formed therebetween because of said direct contact therebetween via said hole, and wherein said coil film is electrically insulated by an organic insulating resinous film having an insulation resistance sufficient to electrically insulate said coil film in view of the thickness of said insulating film.

* * * * *